No. 609,125. Patented Aug. 16, 1898.
R. F. SMITH.
SAW HANDLE.
(Application filed May 17, 1898.)
(No Model.)
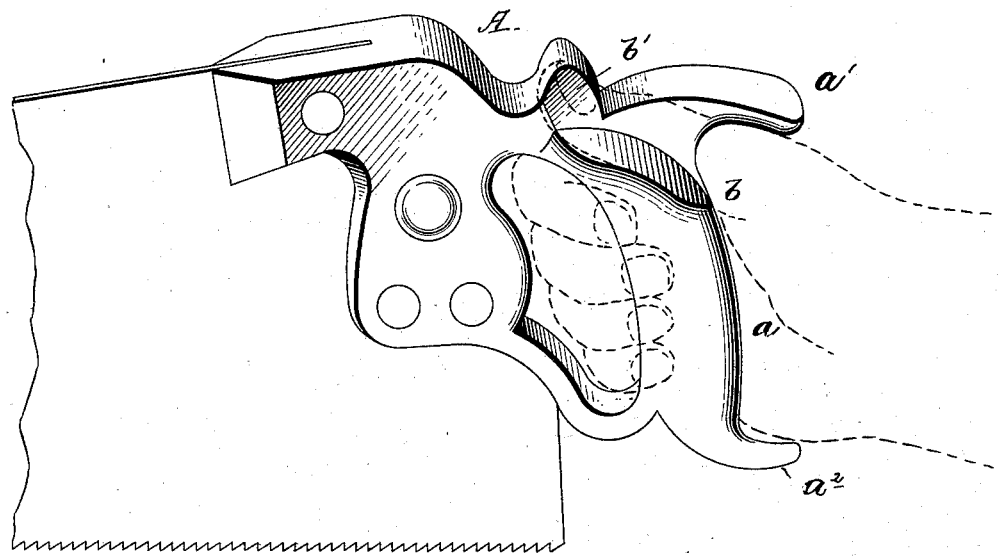
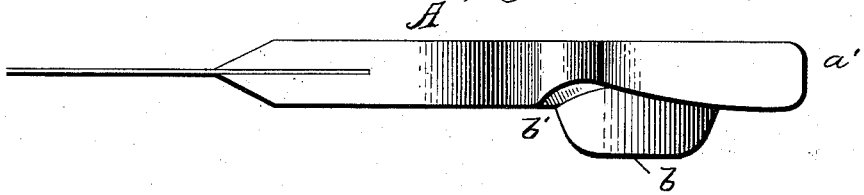
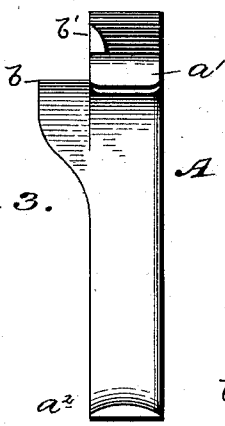
WITNESSES
Robert F. Smith
INVENTOR
by
Eugene W. Johnson
Attorney

UNITED STATES PATENT OFFICE.

ROBERT F. SMITH, OF VICTOR, COLORADO, ASSIGNOR OF ONE-HALF TO FRED FORCH, OF SAME PLACE.

SAW-HANDLE.

SPECIFICATION forming part of Letters Patent No. 609,125, dated August 16, 1898.

Application filed May 17, 1898. Serial No. 680,979. (No model.)

*To all whom it may concern:*

Be it known that I, ROBERT F. SMITH, a citizen of the United States, residing at Victor, in the county of El Paso and State of Colorado, have invented new and useful Improvements in Saw-Handles, of which the following is a specification.

This invention relates to certain new and useful improvements in saw-handles, the object being to provide a handle for saws, said handle being constructed so as to provide on one side of the same a laterally-projecting portion which serves as a bearing or rest for the thumb and above the laterally-projecting bearing-surface with a recess in which the end of the thumb will lie, thus affording to the operator a better grasp upon the handle than is afforded by handles for saws as they are usually constructed and without in any wise weakening the handle or the horns thereof.

In the accompanying drawings, which illustrate my invention, Figure 1 is a perspective view; Fig. 2, a plan view; Fig. 3, a rear elevation, and Fig. 4 a detail perspective view of a modification.

A refers to the saw-handle, which is of ordinary construction, except as to that portion which is to be grasped by the operator, the handle having the usual grip $a$ and horns $a'$ $a^2$. The portion of the grip $a$ below the horn $a'$ is provided with a laterally-projecting portion $b$, the upper edge or face thereof being convex longitudinally, the outer face or side being for a short distance parallel with the opposite side of the handle and then curved inwardly, so as to join the grip with a gradual curve. The upper horn or guide $a'$ is of the normal width at its rear end, and immediately above the projecting portion $b$ the upper part of the handle is cut away or recessed, so as to provide above the forward end of the projecting portion $b$ a recess $b'$, which provides a side and end rest for the thumb, while the convex upper face of the block provides a bearing for the under side of the thumb.

In a saw-handle constructed as shown the grip, or that portion which is grasped by the fingers, is of the usual construction, and the projecting portion, combined with the recess, provides a thumb-rest, so that the thumb will be in a natural position and will be able to exert a downward pressure on the handle, so that the saw can be operated more effectively, which is accomplished without materially weakening the handle. In Fig. 4 of the drawings I have shown a modification which shows a block formed separate from the handle and adapted to be attached to an ordinary handle by means of bolts or screws to provide such a handle with a laterally-projecting thumb-rest.

I am aware that it has been proposed to provide a saw-handle with a recess in which the thumb partially lies, and I do not claim such construction, as in such instance the thumb lies over the handle, which unduly cramps the fingers when they lie over the grip of the handle. Further, the handle is cut away to such an extent that the upper horn is materially weakened.

What I claim is—

1. A saw-handle provided above the portion thereof which is grasped by the fingers with a laterally-projecting portion which extends beyond the vertical plane of the side of the handle the upper edge of which is convex to provide a thumb-rest, substantially as shown and for the purpose set forth.

2. A saw-handle provided with a grip and finger-opening in front of the same, a thumb-rest which projects laterally from the upper portion of the grip to provide a convex bearing-surface the handle adjacent to the forward and upper end of said projecting portion having a recess the horn above the laterally-projecting portion being curved to join the recess, substantially as shown.

In testimony whereof I have hereunto set my hand in presence of two subscribing witnesses.

ROBERT F. SMITH.

Witnesses:
FRED FORCH,
ROY FITZPATRICK.